United States Patent
Lee et al.

(10) Patent No.: US 10,269,238 B2
(45) Date of Patent: Apr. 23, 2019

(54) AIR CONDITIONER AND A COMMUNICATION METHOD FOR AN AIR CONDITIONER

(71) Applicant: LG ELECTRONICS INC., Seoul (KR)

(72) Inventors: Hakrae Lee, Seoul (KR); Yugu Kim, Seoul (KR); Unsik Park, Seoul (KR); Donggi Eom, Seoul (KR); Hanbae Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 15/626,316

(22) Filed: Jun. 19, 2017

(65) Prior Publication Data

US 2017/0363311 A1    Dec. 21, 2017

(30) Foreign Application Priority Data

Jun. 20, 2016    (KR) .................. 10-2016-0076765

(51) Int. Cl.
*H04L 12/707* (2013.01)
*H04L 12/26* (2006.01)
(Continued)

(52) U.S. Cl.
CPC ............ *G08C 19/00* (2013.01); *F24F 1/0003* (2013.01); *F24F 11/30* (2018.01); *F24F 11/54* (2018.01); *F24F 11/61* (2018.01); *F24F 11/62* (2018.01); *F24F 11/88* (2018.01); *G08C 19/34* (2013.01); *H04L 1/0007* (2013.01);
(Continued)

(58) Field of Classification Search
CPC .. F24F 11/30; F24F 11/61; F24F 11/62; F24F 11/63; F24F 11/64; F24F 1/0003; F24F 11/00; F24F 11/54; F24F 11/56; F24F 11/74; F24F 2221/54; F24F 3/00; G08C 19/00; H04L 47/22
See application file for complete search history.

(56) References Cited

U.S. PATENT DOCUMENTS 5,361,985 A * 11/1994 Rein ................. G08C 17/00
                                                       236/49.3
2007/0124447 A1    5/2007 Ajitomi et al.
(Continued)

FOREIGN PATENT DOCUMENTS

EP    1 956 314    8/2008
EP    2 166 293    3/2010
(Continued)

OTHER PUBLICATIONS

Korean Office Action dated Mar. 27, 2017.

*Primary Examiner* — Dionne Pendleton
(74) *Attorney, Agent, or Firm* — KED & Associates LLP

(57) ABSTRACT

An air conditioner and a communication method for an air conditioner are provided. The air conditioner may include an outdoor unit; an indoor unit; and a central controller connected to the indoor unit through a communication line. The indoor unit may perform periodic communication for transmitting a plurality of periodic packets to at least one of the outdoor unit or the central controller at predetermined periods, and change and transmit the plurality of periodic packets so as to decrease a load on the communication line.

11 Claims, 13 Drawing Sheets

(51) Int. Cl.
*H04L 12/835* (2013.01)
*G08C 19/00* (2006.01)
*G08C 19/34* (2006.01)
*F24F 11/54* (2018.01)
*F24F 11/88* (2018.01)
*H04L 1/00* (2006.01)
*H04L 12/815* (2013.01)
*F24F 11/30* (2018.01)
*F24F 11/62* (2018.01)
*F24F 1/0003* (2019.01)
*F24F 11/61* (2018.01)
*F24F 11/63* (2018.01)
*F24F 11/64* (2018.01)

(52) U.S. Cl.
CPC ............ *H04L 1/0083* (2013.01); *H04L 47/22* (2013.01); *F24F 11/63* (2018.01); *F24F 11/64* (2018.01); *G08C 2201/42* (2013.01); *Y02B 70/3275* (2013.01)

(56) References Cited

U.S. PATENT DOCUMENTS

2015/0039752 A1* 2/2015 Hague ................. H04L 12/2803
 709/224
2017/0012861 A1* 1/2017 Blumenthal ........ H04L 43/0829
2017/0317952 A1* 11/2017 Sillankorva ........... H04L 49/201

FOREIGN PATENT DOCUMENTS

KR 10-2012-0085110 7/2012
KR 10-2013-0037116 4/2013
WO WO 2016/059627 4/2016

\* cited by examiner

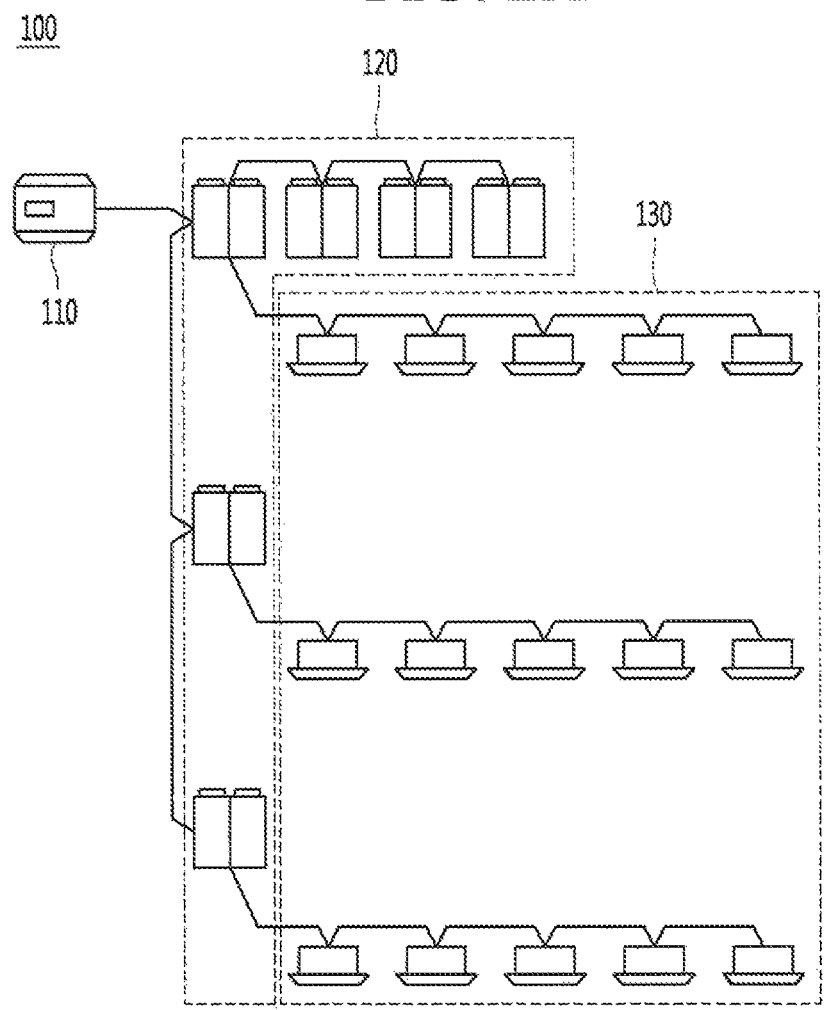

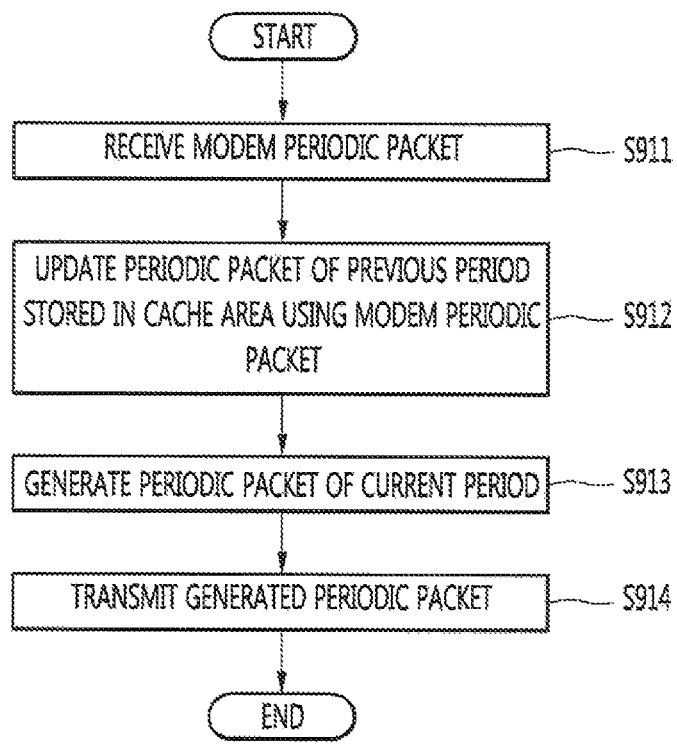

AIR CONDITIONER AND A COMMUNICATION METHOD FOR AN AIR CONDITIONER

CROSS-REFERENCE TO RELATED APPLICATION(S)

This application claims priority under 35 U.S.C. 119 and 365 to Korean Patent Application No. 10-2016-0076765, filed in Korea on Jun. 20, 2016 in the Korean Intellectual Property Office, the disclosure of which is incorporated herein by reference.

BACKGROUND

Field

An air conditioner and a communication method for an air conditioner disclosed herein.

Background

An air conditioner is a home appliance for maintaining indoor air in a most suitable state according to a usage and purpose thereof. The air conditioner may control temperature, humidity, and airflow distribution of a predetermined space to be suited to a user activity or eliminate foreign materials, such as dust, floating in air.

Recently, multi-type air conditioners each having a plurality of indoor units connected to one outdoor unit have been widely used. A multi-type air conditioner has excellent utilization of space upon installation, low installation costs, low power consumption, and excellent energy efficiency.

A multi-type air conditioner includes an outdoor unit, a plurality of indoor units connected to the outdoor unit, and a central controller that controls the outdoor unit. The plurality of indoor units is installed in respective rooms of a building. In general, the outdoor unit may be installed on a rooftop of the building and the central controller may be installed in an administrative room located in the basement.

In such a multi-type air conditioner, in order to control the plurality of indoor units through the central controller, a communication line needs to be connected from the rooftop of the building, at which the outdoor unit is installed to the administrative room in which the central controller is installed. If a user controls an indoor unit through the central controller, several steps should be performed in order to deliver a control command to the indoor unit.

In order to solve such a problem, a new communication system for connecting a central controller to an indoor unit was proposed. By this system, it is possible to easily install the central controller at a desired location even when an internal structure of a building is changed and to reduce steps performed to deliver a control command to the indoor unit to improve a communication speed.

However, in this case, as the central controller is connected to the indoor unit, a communication load between the outdoor unit and indoor unit increases. Accordingly, is necessary to improve the increased communication load between the outdoor and indoor units.

BRIEF DESCRIPTION OF THE DRAWINGS

Embodiments will be described in detail with reference to the following drawings in which like reference numerals refer to like elements, and wherein:

FIGS. 2A and 2B are diagrams illustrating a communication structure of air conditioner according to an embodiment;

FIGS. 9A and 9B are diagrams showing a communication process of an air conditioner according to another embodiment;

DETAILED DESCRIPTION

Hereinafter, embodiments will be described with reference to the accompanying drawings. The suffixes "module" and "unit" for components used in the description below are assigned or mixed in consideration of easiness in writing the specification and do not have distinctive meanings or roles by themselves.

Figure 1:
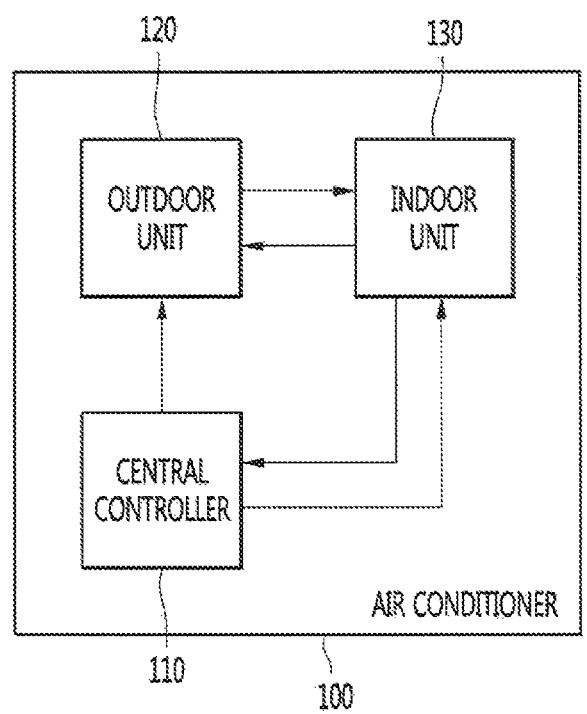
FIG. 1 is a block diagram of an air conditioner according to an embodiment.

FIG. 1 is a block diagram of an air conditioner according to an embodiment. The air conditioner 100 according to this embodiment may include a central controller 110, an outdoor unit 120, and an indoor unit 130. In certain embodiments, the air conditioner 100 may further include a hydro release unit (not shown). The outdoor unit 120 and the indoor unit 130 may be connected through a refrigerant pipe.

The central controller 100 may control operation of the outdoor unit 120 and the indoor unit 130. More specifically, the central controller 110 may transmit control commands to the outdoor unit 120 and the indoor unit 130. The control commands may be related to, for example, on/off operation, cooling/heating mode switching, temperature control, schedule control, power management, and detailed functions.

The central controller 110 may monitor operation states of the outdoor unit 120 and the indoor unit 130. The central controller 110 may operate the air conditioner 100 in a cooling mode or a heating mode in correspondence with any one of a request of the outdoor unit 120, a request of the indoor unit 130, or an external control command. The central controller 110 may be connected to the outdoor unit 120 and the indoor unit 130 through a communication line to perform wired or wireless communication according to a predetermined communication method.

In certain embodiments, the central controller 110 may be connected to the outdoor unit 120 or the indoor unit 130. If the central controller 110 is connected to the outdoor unit 120, for example, the outdoor unit 120 installed or provided outdoors and the central controller 110 installed or provided in the basement administrative room may be connected through the communication line. In this case, the central controller 110 may control the indoor unit 130 through the outdoor unit 120. More specifically, when the central controller 110 transmits a control command to the outdoor unit 120, the outdoor unit 120 may transmit the control command in order to control the plurality of indoor units 130 connected to the outdoor unit 120.

If the central controller 110 is connected to the indoor unit 130, the central controller 110 may be located in a room in which any one of the plurality of indoor units 130 is located and may be connected to the indoor unit 130 installed in the room through a communication line. In this case, the central controller 110 may directly control the indoor unit 130. More specifically, the central controller 110 may directly transmit control commands to the outdoor unit 120 and the plurality of indoor units 130.

The outdoor unit 120 may manage an air conditioning state of the plurality of indoor units 130 connected to the outdoor unit 120. More specifically, the outdoor unit 120 may supply refrigerant to the indoor unit 130 through the refrigerant pipe and control flow of refrigerant circulated through the indoor unit 130. The outdoor unit 120 may include at least one compressor (not shown), an accumulator (not shown), an outdoor heat exchanger (not shown), and an outdoor fan (not shown). The compressor (not shown) may compress inflowing refrigerant to discharge high-pressure gaseous refrigerant. The accumulator (not shown) may divide refrigerant into gaseous refrigerant and liquid refrigerant and prevent unevaporated liquid refrigerant from flowing into the compressor (not shown). The outdoor heat exchanger (not shown) may condense or evaporate refrigerant by heat exchange with external air. The outdoor fan (not shown) may receive air from the outdoor heat exchanger (not shown) and discharge the heat-exchanged air in order to more smoothly perform heat exchange of the outdoor heat exchanger (not shown).

Each indoor unit 130 may discharge cool/warm air generated according to a refrigerant circulation to a room. Each indoor unit 130 may include an expansion valve (not shown), an indoor heat exchanger (not shown), and an indoor fan (not shown). The expansion valve (not shown) may expand refrigerant received from the connected outdoor unit 120. The indoor heat exchanger (not shown) may exchange heat between refrigerant and indoor air. The indoor fan (not shown) may enable indoor air to flow into the indoor heat exchanger (not shown) and enable heat-exchanged air to be discharged into the room. For example, when low-temperature, low-pressure liquid refrigerant flows into the indoor unit 130, liquid refrigerant absorbs heat from indoor air, thus evaporating, and a temperature of indoor air decreases, thereby performing air conditioning.

A plurality of indoor units 130 may be included in the air conditioner 100. In this case, the plurality of indoor units 130 may be installed or provided in offices or rooms of a building, for example.

The air conditioner 100 according to an embodiment may further include a hydro release unit (HRU) (not shown). The HRU may release refrigerant through the refrigerant pipe. The HRU may control a flow rate, and inflow time, for example, of refrigerant flowing in the refrigerant pipe.

In certain embodiments, the HRU (not shown) may be placed at various positions. If the HRU (not shown), the plurality of outdoor unit 120, and the plurality of indoor units 130 are placed in this order, the HRU (not shown) may release refrigerant to the plurality of outdoor units 120 connected thereto. If the plurality of outdoor units 120, the HRU (not shown), and the plurality of indoor units 130 are placed in this order, the HRU (not shown) may release refrigerant received from the plurality of outdoor units 120 to the plurality of indoor units 130.

Hereinafter, components configuring the air conditioner 100, such as the central controller 110, the plurality of outdoor units 120, the plurality of indoor units 130, and the HRU (not shown), are defined as units.

The air conditioner 100 having the above-described configuration may operate in a cooling mode or a heating mode according to a refrigerant flow. If the air conditioner 100 operates in the cooling mode, high-temperature, high-pressure liquid refrigerant is supplied from the compressor (not shown) of the outdoor unit 120 to the indoor unit 130 through the outdoor heat exchanger (not shown) of the outdoor unit 120. As liquid refrigerant expands and evaporates in the indoor heat exchanger (not shown) of the indoor unit 130, a temperature of ambient air decreases. As the indoor fan (not shown) of the indoor unit 130 rotates, cooled air is discharged into the room.

If the air conditioner 100 operates in the heating mode, high-temperature, high-pressure gaseous refrigerant is supplied from the compressor (not shown) of the outdoor unit 120 to the indoor unit 130. When energy is emitted while high-temperature, high-pressure gaseous refrigerant evaporates in the indoor heat exchanger (not shown) of the indoor unit 130, the temperature of ambient air increases due to such energy. As the indoor fan (not shown) of the indoor unit 130 rotates, heated air is discharged into the room.

Figure 2B:
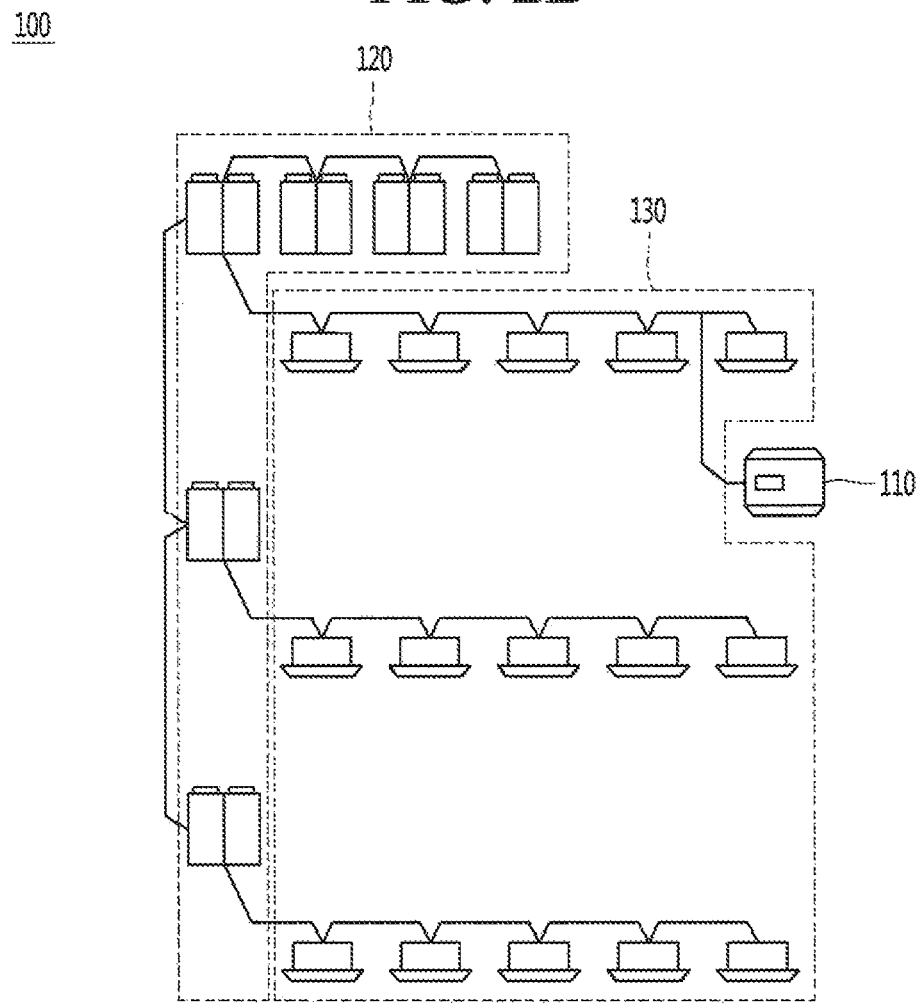

FIGS. 2A and 2B are diagrams illustrating a communication structure of an air conditioner according to an embodiment. For operation of the air conditioner 100, the central control key 110, the plurality of outdoor units 120, and the plurality of indoor units 130 may be connected through communication lines to perform wired communication according to a predetermined communication method. Wired communication may include RS 485 communication, and UART communication, for example. In certain embodiments, the central controller 110, the plurality of outdoor units 120, and the plurality of indoor units 130 may perform wireless communication.

Input/output data, and control data, for example, may be transmitted and received among the central controller 110, the outdoor units 120, and the indoor units 130. Such input/output data, and control data, for example, may be transmitted by a periodic packet and an event packet. The periodic packet and the event packet will be described hereinafter with reference to FIG. 3.

FIG. 2A shows the communication structure of a related art air conditioner 100. In FIG. 2A, the central controller 110 is connected to the outdoor units 10 through communication lines. In general, the central controller 110 may control a maximum of 256 outdoor units 120. Accordingly, the central controller 110 may be connected with a maximum of 256 outdoor units 120. In this case, the central controller 110 may control the plurality of outdoor units 120 by being directly connected thereto through the communication lines.

Each outdoor unit 120 may be connected with the plurality of indoor units 130 through communication lines. In general, each outdoor unit 120 may control a maximum of 64 indoor units 130. Accordingly, each outdoor unit 120 may be connected with a maximum of 64 indoor units 130. In this case, each outdoor unit 120 may control a plurality of indoor units 130 directly connected thereto through communication lines.

In the communication structure of the related art air conditioner 100, the central controller 110 does not directly control the indoor units 130 but controls the indoor units 130 through the outdoor units 120.

FIG. 2B shows the communication structure of an air conditioner 100 according to an embodiment. In FIG. 2B, the central controller 110 is connected to the indoor units 130 through communication lines. More specifically, the central controller 110 may be connected to any one outdoor unit 120 along with the plurality of indoor units 130. In this case, the central controller 110 may control the plurality of indoor units 130 directly connected to the central controller 110 through communication lines. In addition, the central controller 110 may control the plurality of outdoor units 120.

The outdoor unit 120, which is not directly connected to the central controller 110, may be connected with a plurality of indoor units 130 through communication lines. In this case, the outdoor unit 120 may control the plurality of indoor units 130 connected thereto through the communication lines.

In the communication structure of the air conditioner 100 according to an embodiment, the central controller 110 directly controls the indoor units 130 connected thereto through the communication lines.

Figure 3:
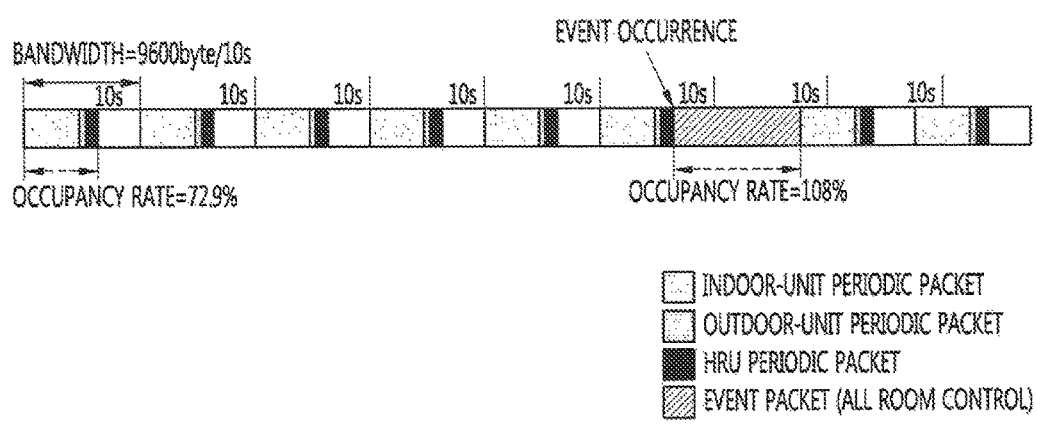
FIG. 3 is a diagram illustrating a communication-line occupancy rate of periodic communication performed by an air conditioner according to an embodiment.

FIG. 3 is a diagram illustrating a communication-line occupancy rate of periodic communication performed by an air conditioner according to an embodiment. In FIG. 3, assume that the air conditioner 100 includes the central controller 110, the plurality of outdoor units 120, the plurality of indoor units 130, and the HRU (not shown).

The units configuring the air conditioner 100 may perform RS 485 communication. In this case, the units may transmit a periodic packet and an event packet. In certain embodiments, the units configuring the air conditioner 100 may perform communication using other communication methods.

The periodic packet may refer to a packet periodically transmitted by a unit. Data included in the periodic packet may include operation information, temperature information, a cycle, central control information and new functions, for example. The transmission periods of the periodic packet may differ between units. Therefore, each unit may transmit the periodic packet at predetermined periods.

The event packet may be transmitted by the unit in order to announce that are event has occurred. Data included in the event packet may be related to at least one of a specific unit, a specific operation, or a specific function, for example.

The event packet may not be allocated a fixed period. Accordingly the unit may transmit an event packet when an event occurs in the unit.

In this case, the communication-line occupancy rate of periodic communication performed by the air conditioner 100 may be calculated as follows.

When the air conditioner 100 shown in FIG. 2A starts to operate, the HRU (not shown) controls the connected outdoor unit 120 and the outdoor unit 120 controls the indoor units 130 connected to the outdoor unit 120. In this case, the indoor unit 130 periodically notifies the outdoor unit 130 connected thereto of state information thereof. The HRU (not shown) transmits an HRU periodic packet to the outdoor unit 120, the outdoor unit 120 transmits outdoor-unit periodic packets to the indoor units 130, and the indoor units 130 transmit indoor-unit periodic packets to the outdoor unit 120. Accordingly, when the HRU periodic packet, the outdoor-unit periodic packets, and the indoor-unit periodic packets are summed, a number of packets periodically transmitted in the air conditioner 100 may be calculated.

In FIG. 3, a bandwidth of the communication line of the air conditioner 100 for transmitting data is 9600 byte/10 s.

The communication-line occupancy rate of the periodic packets is obtained by dividing the number of transmitted periodic packets by the bandwidth of the communication line. In this case, the communication-line occupancy rate of the periodic packets is 72.9% upon being analyzed in units of 10 seconds in a predetermined experimental environment. Accordingly, the number of transmitted periodic packets occupies 72.9% of the communication line.

In the air conditioner 100, an event may occur. In this case, the event packets may be transmitted in order to control all of the indoor units 130. In FIG. 3, the event packets may control all 64 indoor units 130. In this case, the communication-line occupancy rate of the event packets is 108% upon being analyzed in units of 10 seconds in a predetermined experimental environment. Accordingly, the number of transmitted event packets occupies 108% of the communication line.

In the air conditioner 100 according to an embodiment, as shown in FIG. 2B, the central controller 110 is connected to the indoor unit 130. In this case, the indoor units 130 periodically transmit periodic packets indicating state information thereof to the central controller 110. Accordingly, as the indoor units 130 transmit the periodic packets not only to the outdoor units 120 but also to the central controller 110, the number of periodic packets transmitted by the indoor units 130 increases.

As shown in FIG. 3, the existing communication-line occupancy rate of the periodic packets is as high as 72.9%. In this state, when the indoor units 130 further transmit the periodic packets to the central controller 110, a load occurs in the communication line. In this state, when event packets are generated, the communication-line occupancy rate exceeds an acceptable value. In this case, a communication delay, communication failure, or packet loss may occur.

Figure 4:
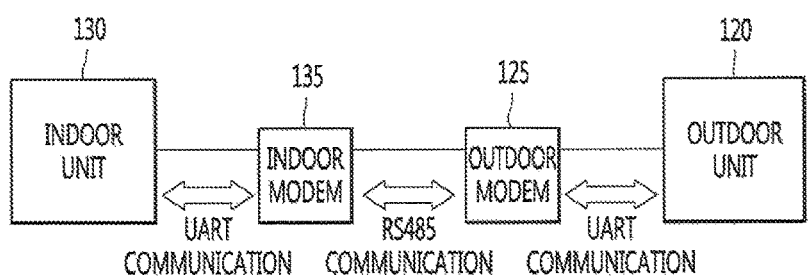
FIG. 4 is a diagram illustrating communication performed between units configuring an air conditioner according to an embodiment.

FIG. 4 is a diagram illustrating communication performed between units configuring an air conditioner according to an embodiment. The air conditioner 100 may include a plurality of units. Each unit may include a modem for performing communication. The modem may be provided inside or outside of each unit.

The units may perform RS 485 communication. RS 485 communication is a serial communication protocol supporting a home network. In RS 485 communication, a plurality of transmission/reception nodes may be connected to one communication line (bus). In this case, the plurality of transmission/reception nodes may perform multilateral data transmission and reception on the same communication line. The plurality of transmission/reception lines may perform communication in a master-slave mode.

Each unit may include a modem. Accordingly, a modem included in any one unit and a modem included in another unit may perform RS 485 communication.

A unit and a modem included in the unit may perform Universal Asynchronous Receiver/Transmitter (UART) communication. The UART communication method refers to a method of transmitting parallel data in series. Such UART communication may be used along with RS-485 communication.

Each unit may include a modem. Accordingly, a unit and a modem included in the unit may perform UART communication.

In FIG. 4, the outdoor unit 120 includes an outdoor modem 125 and the indoor unit 130 includes an indoor modem 135. In this case, UART communication may be performed between the outdoor unit 120 and the outdoor modem 125 and between the indoor unit 130 and the indoor modem 135. In addition, RS 485 communication may be performed between the outdoor unit 120 and the indoor unit 130, that is, between the outdoor modem 125 and the indoor modem 135.

Figure 5:
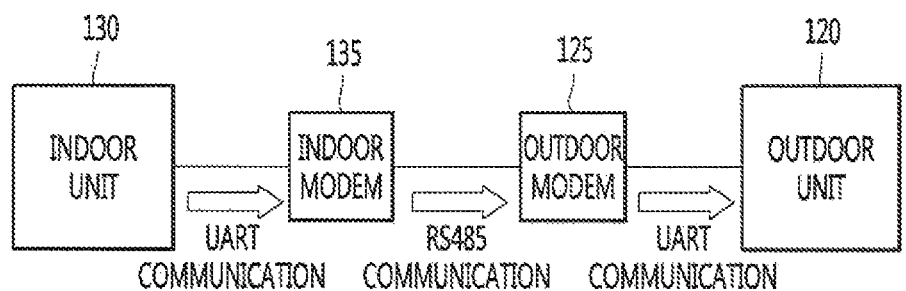
FIG. 5 is a diagram illustrating a communication method of an conditioner according to an embodiment.
Figure 5:
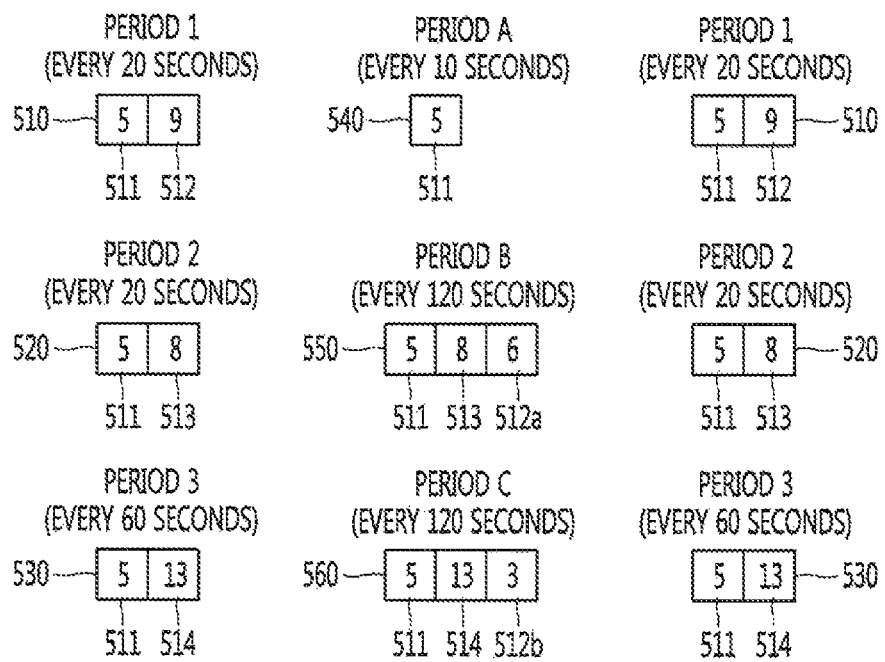

FIG. 5 is a diagram illustrating a communication method of an air conditioner according to an embodiment. According to the communication method of the conditioner 100 according to an embodiment, the air conditioner 100 may rearrange periodic packets and change the transmission periods of the rearranged periodic packets. More specifically, the air conditioner 100 may split data included in any one periodic packet and include the split data in another periodic packet, thereby rearranging the periodic packets. In this case, the air conditioner 100 may decrease or increase the period of each of the rearranged periodic packets.

According to an embodiment, the periodic packets may be indoor-unit periodic packets transmitted from the indoor unit 130 to the outdoor unit 120. Referring to FIG. 3, among the communication-fine occupancy rates of the periodic packets, the occupancy rate of the indoor-unit periodic packets is highest. Accordingly, it is possible to more efficiently decrease the load of the communication line by a largest number of indoor-unit periodic packets. However, embodiments are not limited thereto. In certain embodiments, the outdoor-unit periodic packets or the HRU periodic packets may be controlled.

The process of transmitting the indoor-unit periodic packets from the indoor unit 130 to the outdoor unit 120 may be performed as disclosed hereinafter.

The controller (not shown) of the indoor unit 130 may generate indoor-unit periodic packets. The controller (not shown) of the indoor unit 130 may perform UART communication with the indoor modem 135 and transmit the generated indoor-unit periodic packets to the indoor modem 135.

The indoor modem 135 may rearrange the indoor-unit periodic packets and change the transmission periods of the rearranged indoor-unit periodic packets. More specifically, the indoor modem 135 may split data included in at least one indoor-unit periodic packet and include the split data in another indoor-unit periodic packet, thereby rearranging the indoor-unit periodic packets. In addition, the indoor modem 125 may decrease or increase the period of each of the rearranged indoor-unit periodic packets to change the transmission periods of the indoor-unit periodic packets. In this case, the indoor modem 135 may perform RS 485 communication with the outdoor modem 125 to transmit the indoor-unit periodic packets to the outdoor modem 125 of the outdoor unit 120 according to the changed transmission periods.

The outdoor modem 125 may transmit the received indoor-unit periodic packets to the controller (not shown) of the outdoor unit 120. The outdoor modem 125 may perform UART communication with the controller (not shown) of the outdoor unit 120. The indoor-unit periodic packets delivered to the controller (not shown) may be stored in a cache area of the controller (not shown).

Hereinafter, the above-described process will be described with reference to FIG. 5.

The indoor unit 130 may periodically generate and transmit a period 1 packet 510, a period 2 packet 520, and a period 3 packet 530 to the indoor modem 135. The period 1 packet 510 may include data 5 511 and data 9 512 and be transmitted at a period of 20 seconds. The period 2 packet 520 may include data 5 511 and data 8 513 and be transmitted at a period of 20 seconds. The period 3 packet 530 may include data 5 511 and data 13 514 and be transmitted at a period of 60 seconds.

The indoor modem 135 may rearrange the period 1 packet 510, the period 2 packet 520, and the period 3 packet 530, change transmission periods thereof, and generate new packets. More specifically, data 9 512 may be deleted from the period 1 packet 510 to generate a period A packet 540 including only data 5 511. The data 9 512 deleted from the period 1 packet 510 may be split into data 6 512a and data 3 512b. In this case, the indoor modem 135 may include the split data 6 512a in the period 2 packet 520 to generate a period B packet 550, and include the split data 6 512b in the period 3 packet 530 to generate a period C packet 560.

In this case, the indoor modem 135 may change the transmission periods of the newly generated period A packet 540, period B packet 550, and period C packet 560. As the data 5 511 is included in the period 1 packet 510, the period 2 packet 520, and the period 3 packet 530, the period of the period A packet 540 may be decreased to 10 seconds, for more frequent transmission.

In contrast, as the data 9 512, the data 8 513, and the data 13 514 are transmitted at a period longer than a period of the data 5 511, the transmission periods of the period B packet 550 and the period C packet 560 increase to 120 seconds. Accordingly, the indoor modem 135 transmits, to the outdoor modem 125, the period A packet 540 at a period of 10 seconds, and the period B packet 550 and the period C packet 560 at a period of 120 seconds.

The outdoor modem 125 may receives the period A packet 540, the period B packet 550, and the period C packet 560, regenerate the period 1 packet 510, the period 2 packet 520, and the period 3 packet 530 based on the received packets, and deliver the regenerated packets to the controller (not shown) of the outdoor unit 120 according to respective periods thereof. Accordingly, the period 1 packet 510 including the data 5 511 and the data 9 512 may be transmitted at a period of 20 seconds, the period 2 packet 520 including the data 5 511 and the data 8 513 may be transmitted at a period of 20 seconds, and the period 3 packet 530 including the data 5 511 and the data 13 514 may be transmitted at a period of 60 seconds.

The periodic packets may be periodically transmitted between the indoor unit 130 and the outdoor unit 120. Due to characteristics of the periodic packets, in general, the same data may be repeatedly transmitted at every period. Accordingly, when the indoor unit 130 transmits the periodic packets to the outdoor unit 120, the period of frequently transmitted data may be decreased and the period of infrequently transmitted data increased, thereby dispersing the number of transmitted data. Therefore, the load of the communication line generated by the periodic packets may be reduced.

Figure 6:
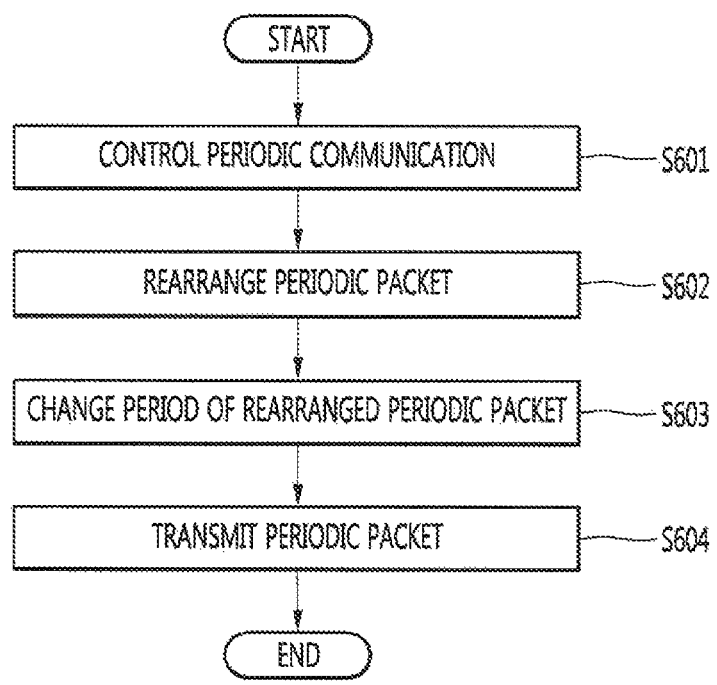
FIG. 6 is a diagram illustrating a communication process of an air conditioner according to an embodiment.

FIG. 6 is a diagram illustrating a communication process of an air conditioner according to an embodiment. The communication method of an air conditioner described with reference to FIG. 5 may be performed in the following process.

An air conditioner, such as air conditioner 100, may control periodic communication (S601). The air conditioner may control periodic communication upon determining that a load is applied to a communication line. In this case, the air conditioner may determine that the load is applied to the communication line, when packets transmitted between units is delayed, transmission or reception fails, or packets are missed, for example. In certain embodiments, the air conditioner may control periodic communication according to user settings. For example, periodic communication may be controlled according to a user request or at periods set by a user.

In control of periodic communication, indoor-unit periodic packets transmitted from an indoor unit, such as indoor unit 130, to an outdoor unit, such as outdoor unit 120, may be controlled. As a transmission number of indoor-unit periodic packets is highest, it is possible to more efficiently decrease the load of the communication line by controlling the indoor-unit periodic packets. However, in certain embodiments, the air conditioner may control the outdoor-unit periodic packets or HRU periodic packets.

The air conditioner may rearrange the periodic packets (S602). More specifically, an indoor modem, such as indoor modem 135, of the indoor unit may split data included in at least one indoor-unit periodic packet and include the split data in another indoor-unit periodic packet.

The air conditioner may change the periods of the rearranged periodic packets (S603). More specifically, the indoor modem of the indoor unit may decrease or increase the period of each of the rearranged indoor-unit periodic packets, thereby changing the transmission periods of the indoor-unit periodic packets.

The air conditioner may transmit the periodic packets (S604). The indoor modem may perform RS 485 communication with an outdoor modem, such as outdoor modem 125, of the outdoor unit, and transmit the rearranged indoor-unit periodic packets to the outdoor unit according to the changed transmission periods.

Figure 7A:
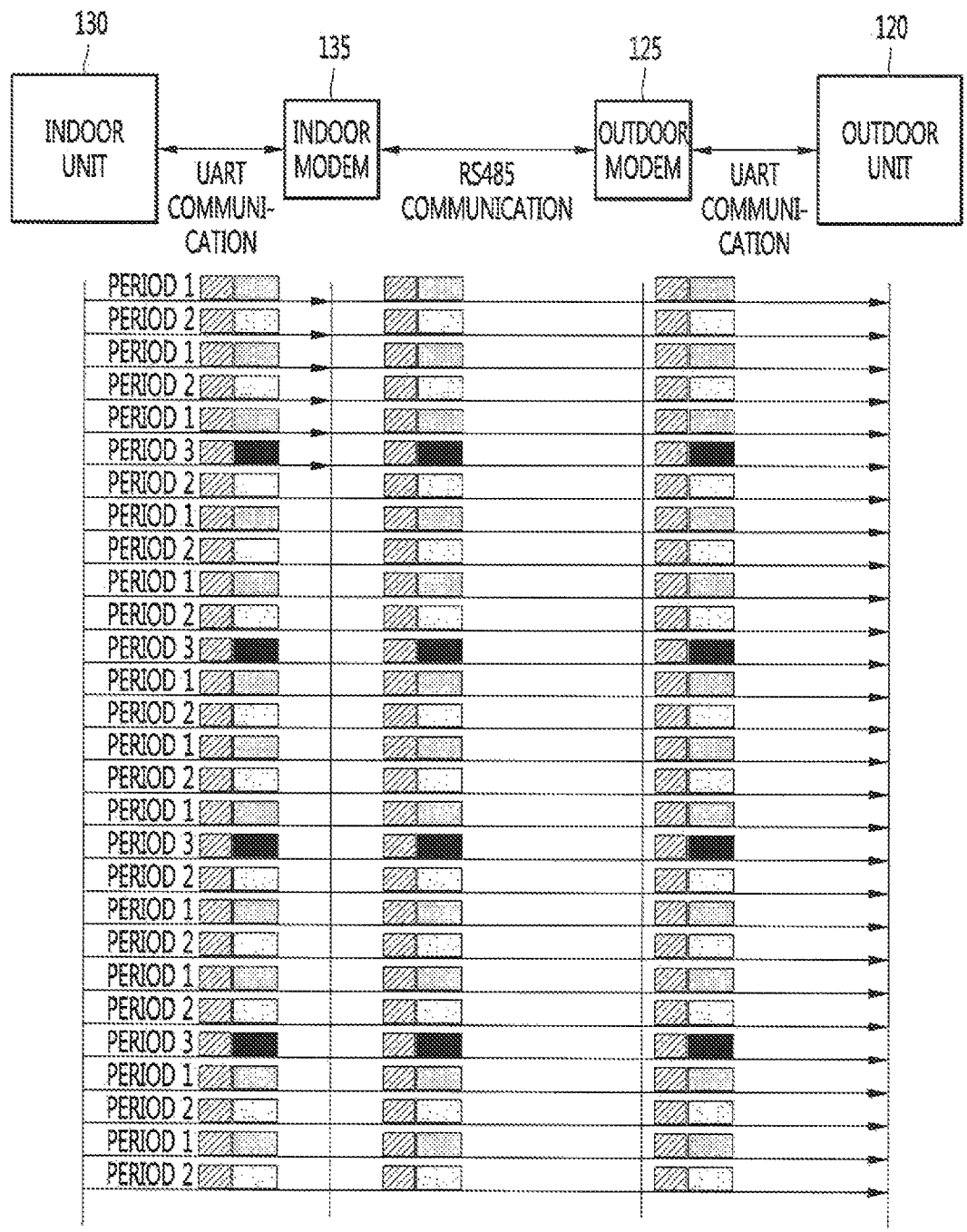
FIGS. 7A and 7B are diagrams illustrating a communication method of an air conditioner according to an embodiments.
Figure 7B:
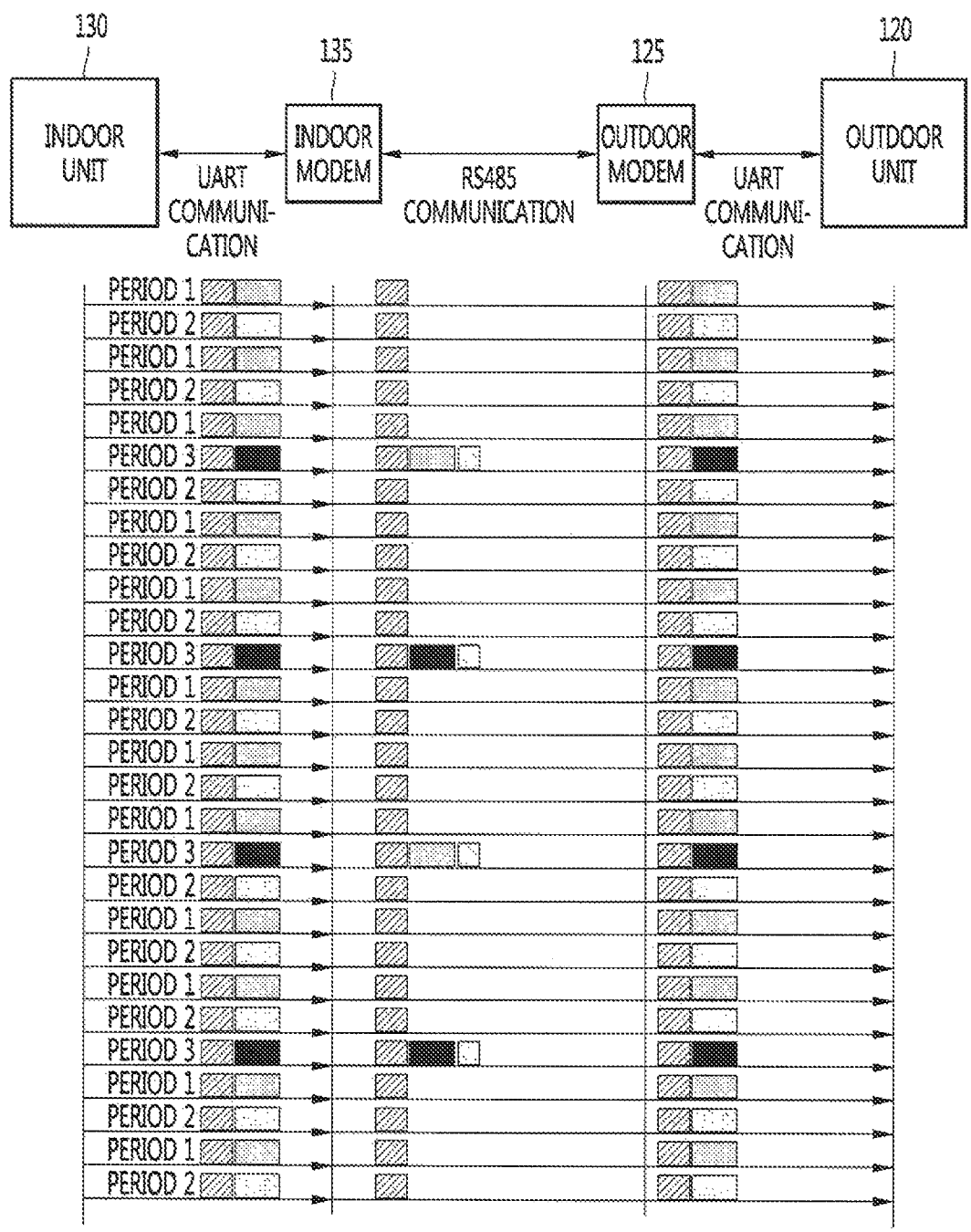

FIGS. 7A and 7B are diagrams illustrating a communication method of an air conditioner according to an embodiment. FIG. 7A shows an example of a periodic packet transmitted and received between a related art indoor unit 130 and a related art outdoor unit 120. Referring to FIG. 7A, the indoor unit 130 transmits the period 1 packet, the period 2 packet and the period 3 packet to indoor modem 135 at respective periods thereof. In this case, the indoor modem 135 transmits the received period 1 packet, the period 2 packet 2, and the period 3 packet to the outdoor modem 125 without change.

FIG. 7B shows an example of a periodic packet transmitted and received between indoor unit 130 and outdoor unit 120 using the communication method according to an embodiment. The indoor modem 135 may filter the data of the periodic packets received from the indoor unit 130, thereby reducing the communication load. More specifically, the indoor modem 135 may filter some data of the received periodic packets. In this case, the indoor modem 135 may rearrange the received periodic packets, change the transmission periods of the rearranged periodic packets, and transmits the periodic packets to the outdoor modem 125.

FIG. 7B shows periodic packets transmitted at a period of 10 seconds. The periods of the period 1 packet, the period 2 packet, and the period 3 packet are 20 seconds, 20 seconds, and 60 seconds, respectively. In addition, the period 1 packet, the period 2 packet, and the period 3 packet include the same data. In this case, the indoor modem 135 may transmit data other than data, which is transmitted at a period of 10 seconds, twice at a period of 120 seconds. Accordingly, as some of the data is filtered and the period of the transmitted data increases, the amount of data transmitted by the periodic packets is dispersed. Referring to FIG. 7B, the amount of data transmitted and received by RS 485 communication between the indoor modem 135 and the outdoor modem 125 decreases. In addition, the transmission period of the data is increased, and thus, the amount of transmitted data is dispersed. Therefore, it is possible to reduce the communication load.

Figure 8:
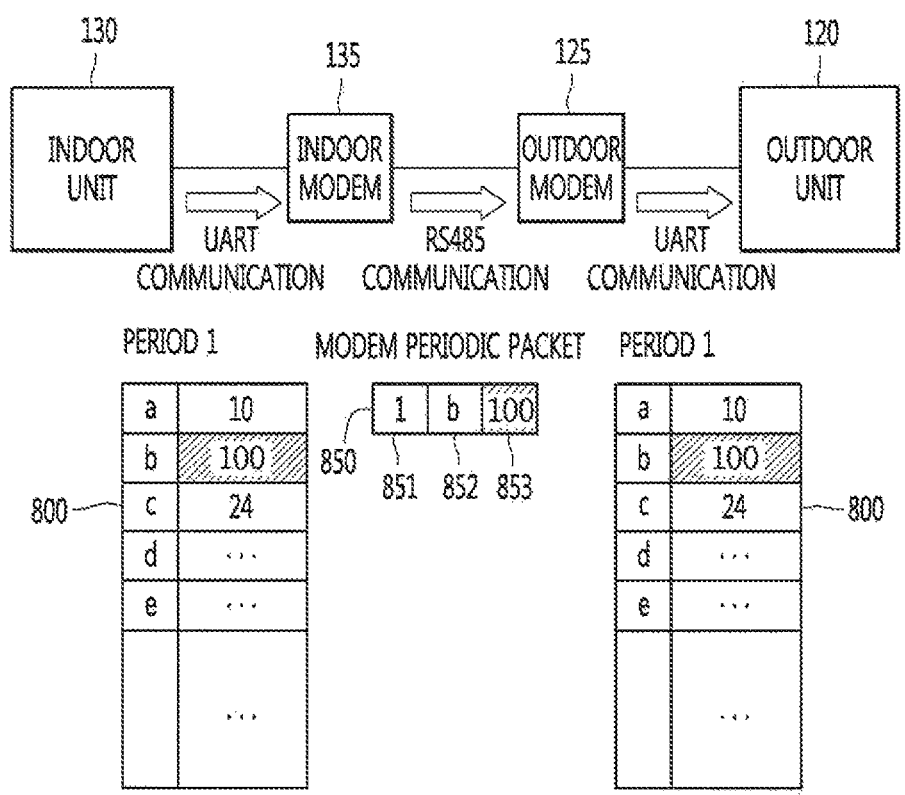
FIG. 8 is a diagram illustrating a communication method of an air conditioner according to another embodiment.

FIG. 8 is a diagram illustrating a communication method of an air conditioner according to another embodiment.

According to a communication method of an air conditioner according to another embodiment, the air conditioner 100 may transmit only a difference with previous data upon transmitting periodic packets. More specifically, the air conditioner 100 may compare periodic packets of a previous period with periodic packets of a current period, determine a difference therebetween, and generate a modem periodic packet including data including the difference. In this case, the air conditioner 100 may transmit the modem period packet instead of the periodic packet of the current period.

According to an embodiment, the periodic packets may be indoor-unit periodic packets transmitted from the indoor unit 130 to the outdoor unit 120. As described above with reference to FIG. 5, it is possible to more efficiently decrease the load of the communication line controlling a largest amount of indoor-unit periodic packets. However, embodiments are not limited thereto. In certain embodiments, the outdoor-unit periodic packets or the HRU periodic packets may be controlled.

According to this embodiment, a process of transmitting the indoor-unit periodic packets from the indoor unit 130 to the outdoor unit 120 may be performed as discussed hereinafter.

The controller (not shown) of the indoor unit 130 may generate indoor-unit periodic packets. The controller (not shown) of the indoor unit 130 may perform UART communication with the indoor modem 135 and transmit the indoor-unit periodic packets to the indoor modem 135.

The indoor modem 135 may compare the indoor-unit periodic packet of the current period with the indoor-unit periodic packet of the previous period and determine a difference therebetween. The indoor-unit periodic packet of the previous period may be stored in the cache area of the memory included in the indoor modem 135. In this case, the indoor modem 135 may read and compare the indoor-unit periodic packet of the previous period stored in the cache area with the indoor-unit periodic packet of the current period received by the indoor modem 135. The indoor modem 135 may determine the difference therebetween according to the result of comparison.

The indoor modem 135 may generate the modem period packet including the data about the difference. In this case, the indoor modem 135 may perform RS 485 communication with the outdoor modem 125 and transmit the modem period packet to the outdoor unit 120 instead of the periodic packet of the current period.

The outdoor modem 125 may receive the modem period packet and update the indoor-unit periodic packet of the previous period based on the modem period packet. The indoor-unit periodic packet of the previous period may be stored in the cache area of the memory included in the outdoor modem 125. In this case, the outdoor modem 125 may read the indoor-unit periodic packet of the previous period stored in the cache area and generate the indoor-unit periodic packet of the current period by referring to the data included in the modem period packet. The indoor-unit periodic packet of the current period may have the same data as the indoor-unit periodic packet of the previous period except for the data included in the modem period packet. The generated indoor-unit periodic packet of the current period may be stored in the cache area of the outdoor modem 125.

The outdoor modem 126 may transmit the generated indoor-unit periodic packet of the current period to the controller (not shown) of the outdoor 120. The outdoor modem 125 may perform UART communication with the controller (not shown) of the outdoor unit 120.

Hereinafter, the above-described process will be described with reference to FIG. 8.

The indoor unit 130 may generate and transmit the period 1 packet 800 of the current period to the indoor modem 135. The period 1 packet 800 may include an a field, a b field, a c field, a d field, and an e field. In this case, a value of the a field is 10, a value of the b field is 100 and a value of the c field is 24.

The indoor modem 135 may receive and compare the period 1 packet 800 of the current period with the period 1 packet (not shown) of the previous period and determine a difference therebetween. In FIG. 8, assume that ail field values are the same except that the b field has another value than 100. In this case, the indoor modem 135 may generate the modem periodic packet 850 based on the determined difference. The modem periodic packet 850 may include a number field 851 indicating a periodic packet number, a field number field 852 indicating a field having a different data value, and a data field 853 indicating another data value. By referring to the modem periodic packet 850 of FIG. 8, it can be seen that the value of the b field of the period 1 packet is changed to 100.

The indoor modem 135 may transmit the generated modem periodic packet 850 to the outdoor modem 125. The outdoor modem 125 may receive the modem periodic packet 850, read the period 1 packet (not shown) of the previous period stored in the cache area, and generate the period 1 packet 800 of the current period by referring to the data included in the modem periodic packet 850. More specifically, the data value of the b field of the period 1 packet (not shown) of the previous period is changed to 100, thereby generating the period 1 packet 600 of the current period.

Only the difference between the periodic packet of the previous period and the periodic packet of the current period is transmitted between the indoor modem 135 and the outdoor modem 125. In this case, the amount of data transmitted between the indoor modem 135 and the outdoor modem 125 is reduced, thereby reducing the load of the communication line generated by the periodic packets.

Figure 9A:
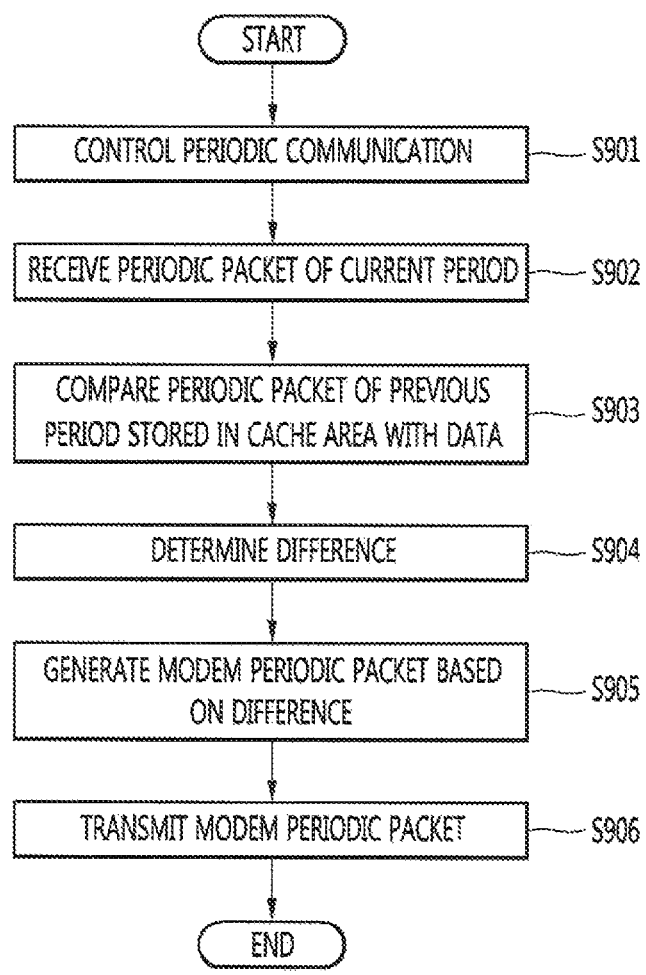

FIGS. 9A and 9B are diagrams showing a communication process of an air conditioner according to another embodiment. The communication method of the air conditioner described with reference to FIG. 8 is performed using the following process. More specifically, FIG. 9A illustrates a case in which an indoor modem, such as indoor modem 135, compares packets of previous and current periods, determines a difference therebetween, and generates and transmits a modem periodic packet, such as modem periodic packet 850, based on the difference.

An air conditioner, such as air conditioner 100, controls periodic communication (S901). The air conditioner may control periodic communication upon determining that a load is applied to a communication line. In certain embodiments the air conditioner may control periodic communication according to user settings.

In control of periodic communication, indoor-unit periodic packets transmitted from an indoor unit such as indoor unit 130, to an outdoor unit such as outdoor unit 120, may be controlled. However, in certain embodiments, the air conditioner may control the outdoor-unit periodic packets or HRU periodic packets.

An indoor modem, such as indoor modem 135, of the air conditioner may receive the periodic packet of the current period (S902). In this case, the indoor modem may receive the periodic packet of the current period from the controller (not shown) of the indoor unit.

The indoor modem of the air conditioner may compare the periodic packet of the previous period stored in a cache area with data (S903). More specifically, the indoor modem may read the periodic packet of the previous period stored in the cache area and compare the periodic packet of the previous period with the periodic packet of the current period received from the controller (not shown) of the indoor unit.

The indoor modem may determine a difference (S904). The indoor modem may then generate a modem periodic packet, such as modem periodic packet 850, based on the difference (S905). According to an embodiment, the modem periodic packet may include a periodic packet number having a changed data value, a field including the changed data value, and the changed data value.

The indoor modem may transmit the generated modem periodic packet (S906). In this case, the indoor modem may perform RS 485 communication with an outdoor modem, such as outdoor modem 125, and transmit the modem periodic packet to the outdoor modem of the outdoor unit.

FIG. 9B illustrates the case where the outdoor modem generates and transmits a current periodic packet, such as current periodic packet 800, based on the modem periodic packet and the previous periodic packet.

The outdoor modem of the outdoor unit may receives the modem periodic packet (S911). The outdoor modem may update the periodic packet of the previous period stored in the cache area based on the modem periodic packet (S912).

The periodic packet of the previous period may be stored in the cache area of the outdoor modem. In this case, the outdoor modem may update the periodic packet of the previous period stored in the cache area using the data included in modem periodic packet.

The outdoor modem may generate the periodic packet of the current period (S913). More specifically, the outdoor modem may read the periodic packet of the previous period stored in the cache area, update the periodic packet using the data included in the modem periodic packet, and generate the periodic packet of the current period.

The outdoor modem may transmit the generated periodic packet (S914). In this case, the outdoor modem may performs UART communication with the outdoor unit and transmit the periodic packet to the controller (not shown) of the outdoor unit.

Figure 10A:
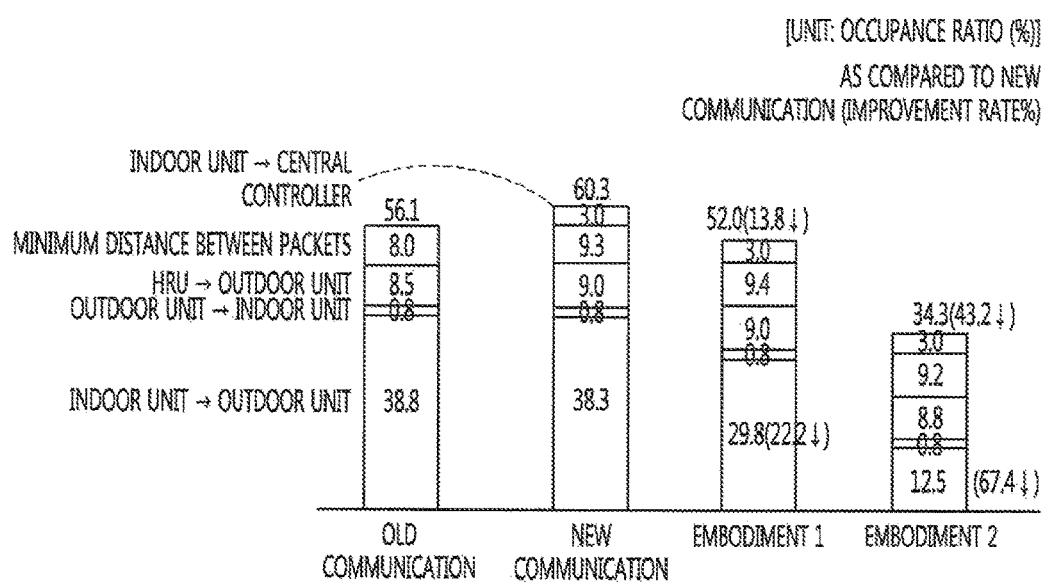
FIGS. 10A and 10B are diagrams illustrating effects of reducing communication load by communication performed by an air conditioner according to an embodiment.
Figure 10B:
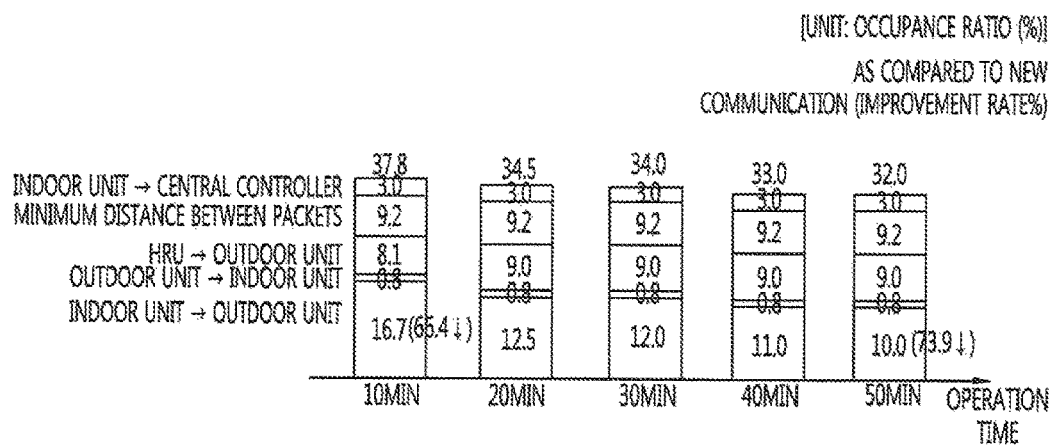

FIGS. 10A and 10B are diagrams illustrating effects of reducing a communication load by communication performed by an air conditioner according to an embodiment. More specifically, FIGS. 10A and 10B show results obtained based on data collected as a result of starting operation of the air conditioner and performing RS 485 communication between the indoor unit and the outdoor unit for 50 minutes.

FIG. 10A shows the data occupancy rate of the periodic packet transmitted in communication methods according to various embodiments. In new communication in which the central controller is connected to the indoor unit, the number of periodic packets transmitted from the indoor unit to the central controller is further increased as compared to old communication in which the central controller is connected to the outdoor unit. Therefore, the total occupancy rate of the periodic packets increases from 56.1% to 60.3%.

In the embodiment described with reference to FIGS. 5 to 7B, the indoor-unit periodic packets are rearranged and the transmission periods thereof are changed. In this case, as compared to new communication, the total data occupancy rate of the periodic packet is reduced from 60.3% to 52.0% and is improved by 13.8%, and the data occupancy rate of the indoor-unit periodic packet transmitted from the indoor unit to the outdoor unit is reduced from 38.3% to 29.8% and is improved by 22.2%.

In the embodiment described with reference to FIGS. 8 to 9B, only the difference between the indoor-unit periodic packets is transmitted. In this case, as compared to new communication, the total data occupancy rate of the periodic packets is reduced from 60.3% to 34.3% and is improved by 43.2%, and the data occupancy rate of the indoor-unit periodic packets transmitted from the indoor unit to the outdoor unit is reduced from 38.3% to 12.5% and is improved by 67.4%.

According to the embodiments, the data occupancy rate of the periodic packets is remarkably reduced and the communication load dispersed.

FIG. 10B shows a change in data occupancy rate of the periodic packets measured in units of 10 minutes upon applying the embodiment of FIGS. 8 to 9B illustrated in FIG. 10A. Referring to FIG. 10B, as a cycle is stabilized with passage of time, the amount of data of the periodic packets decreases. Accordingly, according to the embodiment of FIGS. 8 to 9B, the data occupancy rate of the periodic packets is gradually decreased with passage of time.

Figure 11:
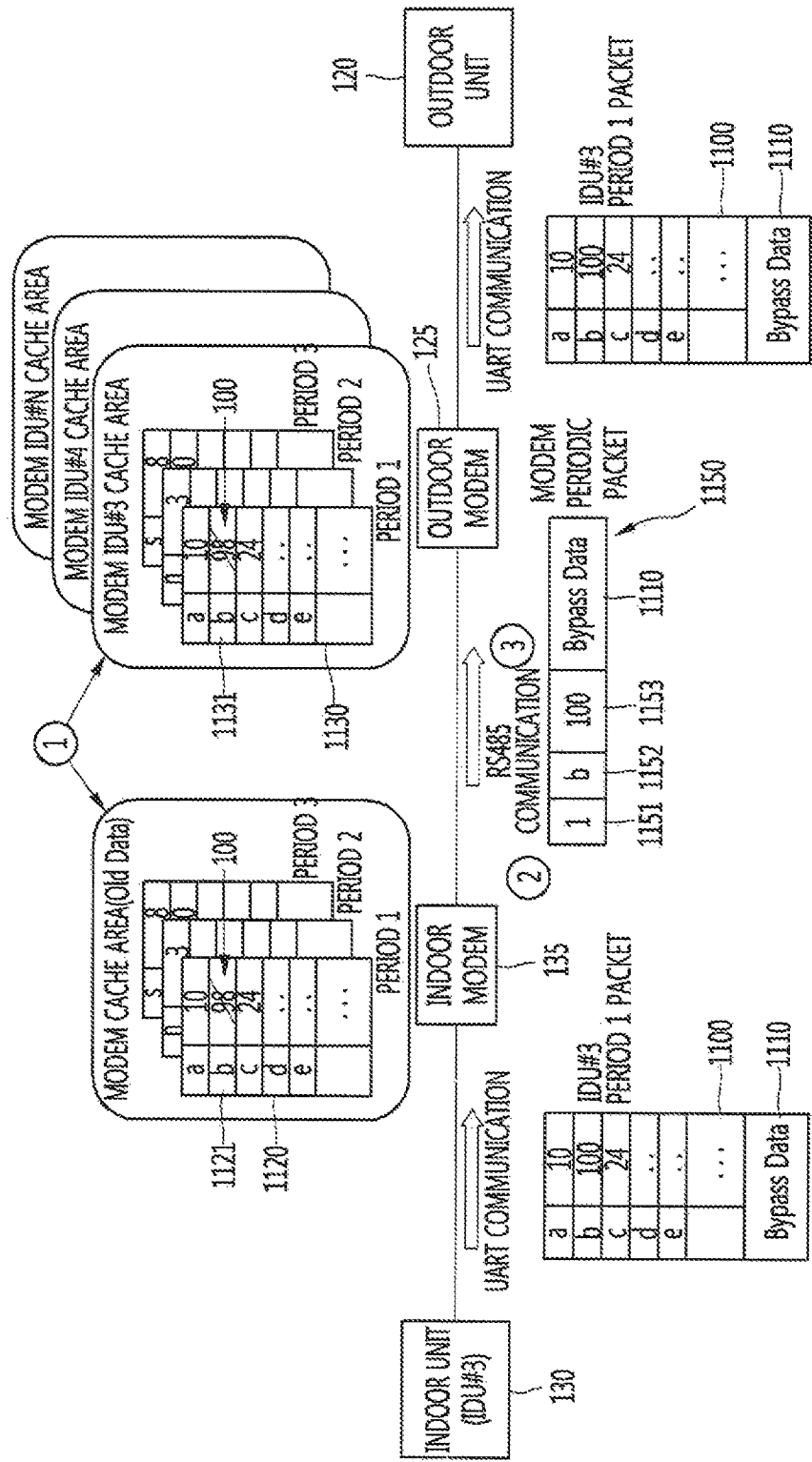
FIG. 11 is a diagram illustrating a cache area of a memory included in an air conditioner according to an embodiment.

FIG. 11 is a diagram illustrating a cache area of a memory included in an aid conditioner according to an embodiment. In order to apply the communication method of embodiments disclosed herein without changing software (S/W) of each of the indoor unit 130 and the outdoor unit 120, a cache area of a memory included in each of the indoor modem 135 and the outdoor modem 125 may be designed as follows.

Data items and the number of data items to be compared or stored in the cache area may be designated. Referring to of FIG. 11, the previous periodic data (old data) of the period 1 packet, the period 2 packet, and period 3 packet may be stored in a cache area of the indoor modem 135. The cache area of the outdoor unit 125 may be allocated in correspondence with the indoor modem 135 of the indoor unit 130. In addition, the data of the current period including the period 1 packet, the period 2 packet, and the period 3 packet may be stored in the area corresponding to the indoor modem 135.

Referring to FIG. 11, the indoor unit 130 may transmit the period 1 packet to the indoor modem 135. In this case the indoor modem 135 may update the previous periodic data stored in the cache area by referring to the period 1 packet 1100. More specifically, the indoor modem 135 may update the period 1 packet 1120 of the previous periodic stored in the cache area by referring to the received period 1 packet 1100. In FIG. 11, the value of b field 1121 is changed from 98 to 100 and the changed value is stored.

The outdoor modem 125 may receive the modem periodic packet 1150. In this case, the outdoor modem 125 may update the previous periodic data stored in the cache area by referring to the modem periodic packet 1150. More specifically, the outdoor modem 125 may update the period 1 packet 1130 of the previous period stored in the cache area by referring to the received modem periodic packet 1150. In FIG. 11, the value of b field 1131 is changed from 98 to 100 and the changed value is stored.

A period number discrimination logic may be performed such that data included in the periodic packet may be transmitted without omission. More specifically, the indoor modem 135 may discriminate the period number as important data of the data of each periodic packet. If all data is the same, only the period number may be transmitted. Referring to of FIG. 11, the modem periodic packet 1150 may include a field 1151 including a periodic packet number having a changed data value, a field 1152 including the changed data value, and a field 1153 including the changed data value. Therefore, it can be seen that the value of the b field of the period 1 packet is changed to 100 as compared to the previous periodic packet.

A bypass function may be set in consideration of expandability and efficiency of the memory. In this case, data added in addition to the designated items may be bypassed. In addition, a frequently changed item may be bypassed. The number or size of cache items may be controlled. In the modem periodic packet 1150, a bypass data field 1110 may be set. Referring to FIG. 11, the bypass data field 1110 may be included in the modem periodic packet 1150. The data included in the bypass data field 1110 may be transmitted without change, that is, without determining the difference with the previous periodic packet.

According to embodiments disclosed herein it is possible to reduce a communication load between indoor and outdoor units increased by connecting a central controller to the indoor unit. In addition, embodiments may be implemented as code which may be written on a computer readable recording medium and thus read by a computer. The computer readable recording medium may be any type of recording device in which data is stored in a computer readable manner. Examples of the computer readable recording medium may include HDD (Hard Disk Drive), SSD (Solid State Drive), SDD (Silicon Disk Drive), ROM, RAM, CD-ROM, a magnetic tape, a floppy disk, and an optical data storage device. If desired, the computer-readable medium may be realized in the form of a carrier wave (for example, a transmission over the Internet). The computer may include a controller of a mobile terminal. The above embodiments are therefore to be construed in all aspects as illustrative and not restrictive. The scope should be determined by the appended claims and their legal equivalents, not by the above description, and all changes coming within the meaning and equivalency range of the appended claims are intended to be embraced therein.

Therefore, embodiments disclosed herein provide an air conditioner capable of improving a communication load between indoor and outdoor units increased by connecting a central controller to the indoor unit, and a communication method thereof.

Embodiments disclosed herein provide an air conditioner that may include an outdoor unit, an indoor unit, and a central controller connected to the indoor unit through a communication line. The indoor unit may perform periodic communication for transmitting a plurality of periodic packets to at least one of the outdoor unit or the central controller at predetermined periods, and change and transmit the plurality of periodic packets so as to decrease a load of the periodic communication.

Embodiments disclosed herein further provide a communication method of an air conditioner that may include an indoor unit that performs periodic communication for transmitting a plurality of periodic packets to at least one of an outdoor unit or a central controller connected to the indoor unit through a communication line at predetermined periods and the indoor unit may change and transmit the plurality of periodic packets so as to decrease a load of the periodic communication.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly various variations and modifications are possible in the component parts and/or arrangements of the subject combination arrangement within the scope or the disclosure, the drawings and the appended claims. In addition to variations and modifications in the component parts and/or arrangements, alternative uses will also be apparent to those skilled in the art.

What is claimed is:

1. An air conditioner, comprising:
an outdoor unit;
an indoor unit; and
a central controller connected to the indoor unit through a communication line,
wherein the indoor unit performs periodic communication for transmitting a plurality of periodic packets to at least one of the outdoor unit or the central controller at predetermined periods, and changes and transmits the plurality of periodic packets so as to decrease a load on the communication line, wherein the indoor unit rearranges data included in the plurality of periodic packets, changes the respective predetermined periods of the plurality of periodic packets, and transmits the plurality of periodic packets; and
wherein the plurality of periodic packets includes a first periodic packet, a second periodic packet, and a third periodic packet, and wherein the indoor unit splits data included in the first periodic packet and includes the split data in the second periodic packet and the third periodic packet.

2. The air conditioner according to claim 1, wherein the plurality of periodic packets is indoor unit periodic packets transmitted from the indoor unit to the outdoor unit.

3. The air conditioner according to claim 1, wherein the indoor unit decreases the predetermined period of the first periodic packet and increases the predetermined periods of the second periodic packet and the third periodic packet.

4. The air conditioner according to claim 1, wherein the indoor unit changes and transmits the plurality of periodic packets such that only data different from data included in the plurality of periodic packets transmitted in a previous period is transmitted in a current period.

5. The air conditioner according to claim 4, wherein the plurality of periodic packets includes a first periodic packet transmitted in the previous period and a second periodic packet transmitted in the current period, and wherein the indoor unit compares the second periodic packet with the first periodic packet, changes the second periodic packet to include only different data, and transmits the second periodic packet.

6. The air conditioner according to claim 5, wherein the indoor unit further includes a memory, and wherein the indoor unit stores the first periodic packet in a cache area of the memory.

7. The air conditioner according to claim 6, wherein the indoor unit updates the first periodic packet stored in the cache area based on the different data.

8. The air conditioner according to claim 1, wherein the air conditioner determines that a load is applied to the communication line, when there is a delay in transmission of the periodic packets, transmission or reception fails, or packets are missed.

9. A communication method of an air conditioner, the communication method comprising:
performing, by an indoor unit, periodic communication for transmitting a plurality of periodic packets to at least one of an outdoor unit or a central controller connected to the indoor unit through a communication line at predetermined periods; and
changing and transmitting, by the indoor unit, the plurality of periodic packets so as to decrease a load on the communication line, wherein the changing and transmitting the plurality of periodic packets includes:
rearranging data included in the plurality of periodic packets,
wherein the plurality of periodic packets includes a first periodic packet, a second periodic packet, and a third periodic packet, and wherein the indoor unit splits data included in the first periodic packet and includes the split data in the second periodic packet and the third periodic packet;
changing the respective transmission periods of the plurality of rearranged periodic packets; and
transmitting the plurality of rearranged periodic packets according to the changed respective transmission periods thereof.

10. The communication method according to claim 9, wherein the changing and transmitting the plurality of periodic packets includes changing and transmitting the plurality of periodic packets such that only data different from data included in the plurality of periodic packets transmitted in a previous period is transmitted in a current period.

11. The communication method according to claim 9, wherein the changing and transmitting the plurality of periodic packets includes:
storing a first periodic packet of the plurality of periodic packets transmitted in the previous period in a memory of the air conditioner;
updating the first periodic packet stored in the memory based on a difference between the first periodic packet of the plurality of periodic packets to be transmitted in the current period and the first periodic packet stored in the memory; and transmitting the updated first periodic packet.

* * * * *